Figures 1, 2:
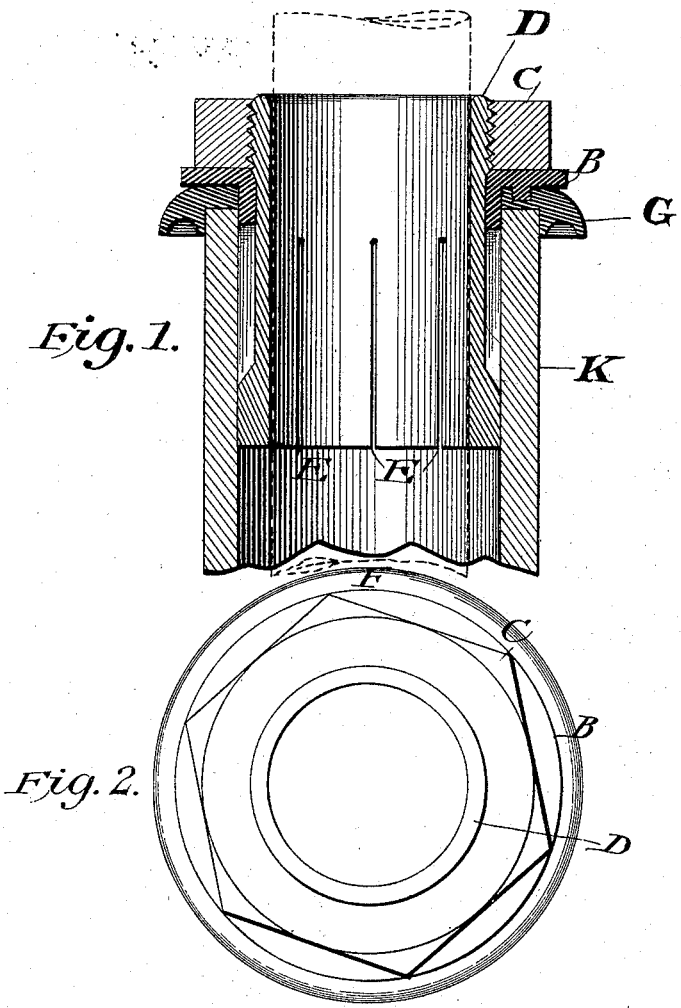

(No Model.)

G. W. KORTRIGHT.
TELESCOPIC CLAMP.

No. 605,447. Patented June 7, 1898.

Witnesses.
C. W. Ashley.
W. I. Kortright.

Inventor.
G. W. Kortright

UNITED STATES PATENT OFFICE.

REISSUED

GEORGE W. KORTRIGHT, OF SIOUX CITY, IOWA.

TELESCOPIC CLAMP.

SPECIFICATION forming part of Letters Patent No. 605,447, dated June 7, 1898.

Application filed January 12, 1897. Serial No. 618,982. (No model.)

*To all whom it may concern:*

Be it known that I, GEORGE W. KORTRIGHT, a citizen of the United States, residing at Sioux City, Woodbury county, State of Iowa, have invented certain new and useful Improvements in Telescopic Clamps; and I do hereby declare that the following is a full, clear, and exact description of the invention, which will enable others skilled in the art to which it appertains to use the same.

My invention relates to an improvement in clamps, one section drawing squarely against the other, forcing the inside in and the outside out, forming a clamp between the two sections to be clamped together, also forming a lock-nut on top. As the inside section tightens the nut is forced down, as would be necessary on the handle-bar of a bicycle. I attain these objects by the mechanism illustrated in the accompanying drawings, in which—

Figure 1 is a central longitudinal sectional view through the clamp. Fig. 2 is an end view.

D is the main or inner case, and C the nut threaded on the top end of the inner case.

E E E are the slots cut into the inner case to allow same to contract when the outer wedge B is forced down by the nut C, the outer section B being also slotted to correspond with slots E E E, allowing it to spread at the same time the inner case contracts, forming a solid joint outside and in.

G is a cap fitted over the outer tubing K and on which the flanged shell B rests.

What I claim as my invention, and wish to secure by Letters Patent, is—

1. In a telescopic clamping device, the combination of an outer tubular member, a ring fastened inside its end, an inner tubular slotted clamping member having a beveled shoulder thereon engaging said ring, and a nut threaded on the projecting end of said inner member and bearing against the outer member, as set forth.

2. In a telescopic clamp, the combination with the inner and outer tubings, the slitted shell D threaded at its upper end and fitted into the outer tubing, the recessed cap G mounted on the end of the said outer tubing, the clamping-shell B having a flanged upper end, the cylindrical portion of shell B slitted and fitted about the contracted portion of shell D, and the tightening-nut threaded on the upper end of the inner shell and bearing against the flange of the outer shell, as shown and described.

GEO. W. KORTRIGHT.

Witnesses:
C. W. ASHLEY,
W. I. KORTRIGHT.